US012767126B2

(12) United States Patent
Oh

(10) Patent No.: US 12,767,126 B2
(45) Date of Patent: Oct. 20, 2026

(54) LIDAR-BASED OBJECT CONTOUR AND BOUNDING BOX TRANSFORMATIONS AND ANALYSIS FOR VEHICLE CONTROL

(71) Applicants: Hyundai Motor Company, Seoul (KR); Kia Corporation, Seoul (KR)

(72) Inventor: Tae Dong Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 98 days.

(21) Appl. No.: 18/773,856

(22) Filed: Jul. 16, 2024

(65) Prior Publication Data

US 2025/0214571 A1 Jul. 3, 2025

(30) Foreign Application Priority Data

Jan. 2, 2024 (KR) ........................ 10-2024-0000338

(51) Int. Cl.

*B60W 30/09* (2012.01)
*B60W 60/00* (2020.01)
*G01S 17/931* (2020.01)

(52) U.S. Cl.

CPC ........ *B60W 30/09* (2013.01); *B60W 60/0015* (2020.02); *G01S 17/931* (2020.01); *B60W 2554/402* (2020.02); *B60W 2554/4042* (2020.02)

(58) Field of Classification Search

CPC ............. B60W 30/09; B60W 60/0015; B60W 2554/402; B60W 2554/4042; G01S 17/931

See application file for complete search history.

(56) References Cited

U.S. PATENT DOCUMENTS

| | | | | | |
|---|---|---|---|---|---|
| 12,012,122 | B1 * | 6/2024 | Papi | ...................... | B60W 30/09 |
| 2014/0324266 | A1 * | 10/2014 | Zhu | ...................... | G01S 13/865 382/104 |
| 2018/0203447 | A1 * | 7/2018 | Wyffels | ................. | B60W 30/09 |
| 2022/0204029 | A1 * | 6/2022 | Chen | ...................... | G01S 17/42 |
| 2022/0299626 | A1 * | 9/2022 | Chen | ...................... | G01S 13/931 |
| 2024/0264276 | A1 * | 8/2024 | Long | ...................... | G01S 7/417 |

FOREIGN PATENT DOCUMENTS

| | | | | |
|---|---|---|---|---|
| CN | 115432007 A | * 12/2022 | .......... | B60W 30/095 |
| WO | WO-2022055873 A1 | * 3/2022 | ........... | G01S 7/4817 |

OTHER PUBLICATIONS

Qi, Charles R., et al. "Pointnet: Deep learning on point sets for 3d classification and segmentation." Proceedings of the IEEE conference on computer vision and pattern recognition. 2017.

* cited by examiner

*Primary Examiner* — Kenneth M Dunne
(74) *Attorney, Agent, or Firm* — Banner & Witcoff, Ltd.

(57) ABSTRACT

A vehicle control apparatus includes a sensor, such as light detection and ranging (LiDAR), and a processor. The processor may generate a first bounding box corresponding to an external object based on contour points representing a shape of the external object, generate a second bounding box based on aligning first vertices included in the first bounding box around a reference axis, determine whether the first bounding box or the second bounding box indicates that the external object does not interfere with an operation region of the vehicle, based on the contour points, second vertices included in the second bounding box, and dynamics information of the external object.

19 Claims, 9 Drawing Sheets

LIDAR-BASED OBJECT CONTOUR AND BOUNDING BOX TRANSFORMATIONS AND ANALYSIS FOR VEHICLE CONTROL

CROSS-REFERENCE TO RELATED APPLICATION

This application claims the benefit of priority to Korean Patent Application No. 10-2024-0000338, filed in the Korean Intellectual Property Office on Jan. 2, 2024, the entire contents of which are incorporated herein by reference.

TECHNICAL FIELD

The present disclosure relates to a vehicle control apparatus and a method thereof, and more particularly, relates to a technology for identifying external objects.

BACKGROUND

Various studies are being conducted to develop techniques to identify an external object of a vehicle by using various sensors to provide driving assistance to the vehicle.

In particular, while the vehicle is driving in a driving assistance device activation mode or an autonomous driving mode, an external object (e.g., debris, vehicles, medians, etc.) may be identified by using various sensors (e.g., light detection and ranging (LiDAR), a camera, or radio detection and ranging (RADAR)).

The external object may be identified by combining pieces of sensor data obtained through one or more sensors if the external object is identified by using the various sensors.

SUMMARY

The present disclosure was made to solve the above-mentioned problems occurring in at least some implementations while advantages achieved by those implementations are maintained intact.

An aspect of the present disclosure provides a vehicle control apparatus for providing assistance in a driving assistance mode of a vehicle or an autonomous driving mode of the vehicle by identifying invalid objects that do not cause collisions with the vehicle, and a method thereof.

An aspect of the present disclosure provides a vehicle control apparatus for improving the driving stability of the vehicle by determining that an external object is a ghost object, based on dynamics information of the external object, together with information (e.g., at least one of contour points, or a bounding box, or any combination thereof) associated with the shape of the external object, and a method thereof.

An aspect of the present disclosure provides a vehicle control apparatus for preventing sudden braking of the vehicle to provide a comfortable driving environment for passengers of the vehicle, by relatively accurately distinguishing between a valid object and an invalid object (e.g., a ghost object), and a method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, a vehicle control apparatus may include: a sensor; and a processor. The processor may be configured to: generate, based on contour points obtained through the sensor and representing a shape of an external object of a vehicle, a first bounding box corresponding to the external object; generate, based on aligning first vertices included in the first bounding box around a reference axis, a second bounding box; determine whether the first bounding box or the second bounding box indicates that the external object does not interfere with an operation region of the vehicle, based on the contour points, second vertices included in the second bounding box, and dynamics information of the external object; and control, based on the determination, an operation of the vehicle. The reference axis may be chosen from one of a first axis, a second axis, and a third axis The processor may be configured to generate the second bounding box by: determining, by rotating the first vertices by a predetermined angle around the reference axis, a quadrilateral having a smallest size on a plane formed by axes different from the reference axis; and determining the second bounding box based on vertices included in the quadrilateral.

The processor may be configured to generate the second bounding box by: determining, based on a gradient angle of a lane in which the external object is located, a minimum value and a maximum value of the first vertices in a direction of the reference axis; and determining the second bounding box further based on the minimum value and the maximum value.

The processor may be configured to: align the first vertices by moving, based on an average of coordinate values of the first vertices, the first bounding box around the reference axis.

The processor may be further configured to: adjust a size of the second bounding box based on a type of the external object.

The processor may be configured to adjust the size of the second bounding box by one of: adjusting, based on the external object being located in front of the vehicle, the size of the second bounding box based on a rear surface of the external object; or adjusting, based on the external object being located at a rear of the vehicle, the size of the second bounding box based on a front surface of the external object.

The processor may be configured to: determine, based on points within the second bounding box forming a specified shape, that the first bounding box or the second bounding box indicates that the external object does not interfere with the operation region of the vehicle.

The processor may be configured to: determine, based on no points within the second bounding box forming a specified shape, that the first bounding box or the second bounding box indicates that the external object interferes with the operation region of the vehicle.

The vehicle control apparatus may further include: memory storing a neural network model. The processor may be configured to determine whether the first bounding box or the second bounding box indicates that the external object does not interfere with the operation region of the vehicle based on applying the contour points, the second vertices, and the dynamics information into the neural network model. The neural network model may be configured to determine whether the first bounding box or the second bounding box indicates that the external object does not interfere with the operation region of the vehicle, based on points, whose quantity is smaller than a specified quantity and which are included in the second bounding box, by performing learning by using data sets associated with autonomous driving of the vehicle.

The vehicle control apparatus may further include: memory storing a neural network model. The processor may be configured to determine whether the first bounding box or the second bounding box indicates that the external object does not interfere with the operation region of the vehicle, based on applying the contour points, the second vertices, and the dynamics information into the neural network model. The neural network model may be configured to determine whether the first bounding box or the second bounding box indicates that the external object does not interfere with the operation region of the vehicle, by using at least one of an absolute speed of the external object, longitudinal speed of the external object, a lateral speed of the external object, whether the external object is moving, a heading of the external object, a type of the external object, the sensor identifying the external object, reliability of the sensor, shape information associated with contour points, points included in the first bounding box, or points included in the second bounding box.

The dynamics information may include at least one of a speed of the external object, whether the external object is moving, the sensor identifying the external object, or a type of the external object.

According to one or more example embodiments of the present disclosure, a vehicle control method may include: generating, based on contour points obtained through a sensor and representing a shape of an external object of a vehicle, a first bounding box corresponding to the external object; generating, based on aligning first vertices included in the first bounding box around a reference axis, a second bounding box; determining whether the first bounding box or the second bounding box indicates that the external object does not interfere with an operation region of the vehicle based on the contour points, second vertices included in the second bounding box, and dynamics information of the external object; and controlling, based on the determination, an operation of the vehicle. The reference axis may be chosen from one of a first axis, a second axis, and a third axis Generating the second bounding box may include: determining, by rotating the first vertices by a predetermined angle around the reference axis, a quadrilateral having a smallest size on a plane formed by axes different from the reference axis; and determining the second bounding box based on vertices included in the quadrilateral.

Generating the second bounding box may include: determining, based on a gradient angle of a lane in which the external object is located, a minimum value and a maximum value of the first vertices in a direction of the reference axis; and determining the second bounding box further based on the minimum value and the maximum value.

The method may further include: aligning the first vertices by moving, based on an average of coordinate values of the first vertices, the first bounding box around the reference axis.

The method may further include: adjusting a size of the second bounding box based on a type of the external object.

Adjusting the size of the second bounding box may include one of: adjusting, based on the external object being located in front of the vehicle, the size of the second bounding box based on a rear surface of the external object; or adjusting, based on the external object being located at a rear of the vehicle, the size of the second bounding box based on a front surface of the external object.

The method may further include: determining, based on points within the second bounding box forming a specified shape, that the first bounding box or the second bounding box indicates that the external object does not interfere with the operation region of the vehicle.

The method may further include: determining, based on no points within the second bounding box forming a specified shape, that the first bounding box or the second bounding box indicates that the external object interferes with the operation region of the vehicle.

The method may further include: determining whether the first bounding box or the second bounding box indicates that the external object does not interfere with the operation region of the vehicle based on applying the contour points, the second vertices, and the dynamics information into a neural network model. The neural network model may be configured to determine whether the first bounding box or the second bounding box indicates that the external object does not interfere with the operation region of the vehicle, based on points, whose quantity is smaller than a specified quantity and which are included in the second bounding box, by performing learning by using data sets associated with autonomous driving of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
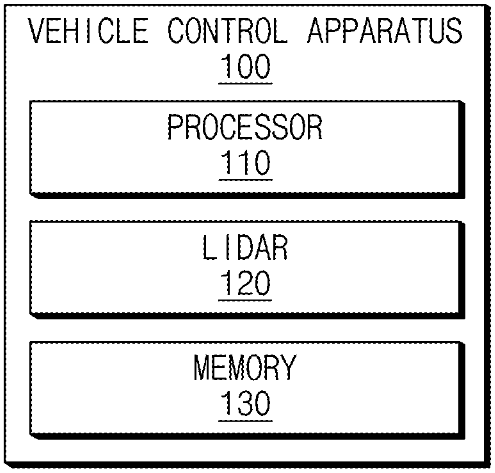
FIG. 1 shows an example of a block diagram associated with a vehicle control apparatus, according to an embodiment of the present disclosure.

Hereinafter, some embodiments of the present disclosure will be described in detail with reference to the accompanying drawings. In adding reference numerals to components of each drawing, it should be noted that the same components include the same reference numerals, although they are indicated on another drawing. Furthermore, in describing the embodiments of the present disclosure, detailed descriptions associated with well-known functions or configurations will be omitted if they may make subject matters of the present disclosure unnecessarily obscure.

In describing elements of an embodiment of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as including a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 9.

FIG. 1 shows an example of a block diagram associated with a vehicle control apparatus, according to an embodiment of the present disclosure.

Referring to FIG. 1, a vehicle control apparatus 100 according to an embodiment of the present disclosure may be implemented inside or outside a vehicle, and some of components included in the vehicle control apparatus 100 may be implemented inside or outside the vehicle. At this time, the vehicle control apparatus 100 may be integrated with internal control units of a vehicle and may be implemented with a separate device so as to be coupled with control units of the vehicle by means of a separate connection means. For example, the vehicle control apparatus 100 may further include components not shown in FIG. 1.

Referring to FIG. 1, the vehicle control apparatus 100 according to an embodiment may include a processor 110, a sensor (e.g., LiDAR) 120, and a memory 130. The processor 110, the LiDAR 120, or the memory 130 may be electrically and/or operably coupled with each other by an electronic component including a communication bus.

Hereinafter, the fact that pieces of hardware are coupled operably may include the fact that a direct and/or indirect connection between the pieces of hardware is established by wired and/or wirelessly such that second hardware is controlled by first hardware.

Although different blocks are shown, an embodiment is not limited thereto. Some of the pieces of hardware in FIG. 1 may be included in a single integrated circuit including a system on a chip (SoC). The type and/or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 according embodiment may include hardware for processing data based on one or more instructions. The hardware for processing data may include the processor 110. For example, the hardware for processing data may include an arithmetic and logic unit (ALU), a floating point unit (FPU), a field programmable gate array (FPGA), a central processing unit (CPU), and/or an application processor (AP).

The processor 110 may include a structure of a single-core processor, or may include a structure of a multi-core processor including a dual core, a quad core, a hexa core, or an octa core.

The sensor (e.g., LiDAR) 120 of the vehicle control apparatus 100 according to an embodiment may obtain data sets obtained by identifying objects surrounding the vehicle control apparatus 100 (or a vehicle including the vehicle control apparatus 100). For example, the sensor (e.g., LiDAR) 120 may identify at least one of a location of the surrounding object, a movement direction of the surrounding object, or speed of the surrounding object, or any combination thereof based on a pulse laser signal emitted from the sensor (e.g., LiDAR) 120 being reflected by the surrounding object and returned.

Figure 3:
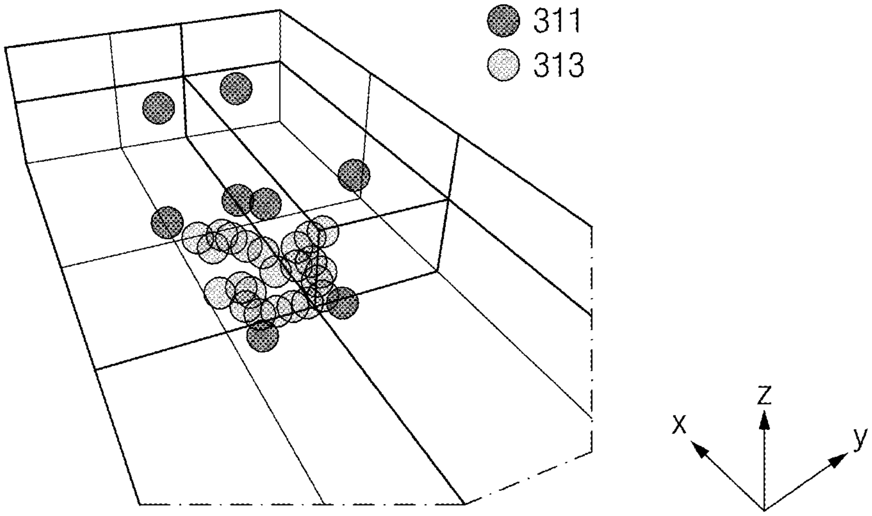
FIG. 3 shows an example associated with contour points corresponding to an external object, and vertices of a first virtual box corresponding to an external object, in an embodiment of the present disclosure.

For example, the sensor (e.g., LiDAR) 120 may obtain data sets for expressing a surrounding external object in the space defined by a first axis, a second axis, and a third axis based on a pulse laser signal reflected from surrounding objects. For example, the sensor (e.g., LiDAR) 120 may obtain data sets including a plurality of points (or a point cloud) in the space, which is formed by the first axis, the second axis, and the third axis, based on receiving the pulse laser signal at a specified period. A first axis may be, for example, a longitudinal axis of the vehicle, such as the x-axis as shown in FIG. 3. A second axis may be, for example, a transverse axis of the vehicle, such as the y-axis as shown in FIG. 3. A third axis may be, for example, a vertical axis of the vehicle, such as the z-axis as shown in FIG. 3.

The processor 110 of the vehicle control apparatus 100 according to an embodiment may emit light from a vehicle by using the sensor (e.g., LiDAR) 120. For example, the processor 110 may receive light emitted from the vehicle. For example, the processor 110 may identify at least one of a location, a speed, or a moving direction, or any combination thereof of a surrounding object based on a time required to transmit light emitted from the vehicle and a time required to receive light emitted from the vehicle. For example, the moving direction of the surrounding object described above may include a heading direction of the surrounding object.

For example, the first axis may include an x-axis. For example, the second axis may include a y-axis. For example, the third axis may include a z-axis. For example, the first axis, the second axis, and the third axis may be perpendicular to each other and may intersect each other based on an origin point. The first axis, the second axis, and the third axis are not limited to the above examples. Hereinafter, for convenience of description, the first axis is described as the x-axis; the second axis is described as the y-axis; and the third axis is described as the z-axis. The first axis, the second axis, and the third axis described above may be included in the vehicle coordinate system expressed based on the vehicle.

The memory 130 of the vehicle control apparatus 100 according to an embodiment may include a hardware component for storing data and/or instructions that are to be input and/or output to the processor 110 of the vehicle control apparatus 100.

For example, the memory 130 may include a volatile memory including a random-access memory (RAM), or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof.

For example, the non-volatile memory includes at least one of a programmable ROM (PROM), an erasable PROM (EPROM), an electrically erasable PROM (EEPROM), a flash memory, a hard disk, a compact disk, a solid state drive (SSD), or an embedded multi-media card (eMMC), or any combination thereof.

For example, a neural network model for identifying an external object (e.g., a surrounding object) may be stored in the memory 130. For example, the neural network model for identifying an external object may output at least one of the type of the external object, the validity of the external object, the speed of the external object, or a heading direction of the external object, or any combination thereof based on input data.

The processor 110 of the vehicle control apparatus 100 according to an embodiment may obtain contour points and/or a point cloud representing the shape of an external object through the sensor (e.g., LiDAR) 120. For example, the processor 110 may generate a first bounding box corresponding to the external object based on the obtaining contour points and/or the point cloud representing the shape of the external object. For example, the first bounding box may include a three-dimensional (3D) figure including a rectangular parallelepiped expressed in a 3D coordinate system, and/or a planar figure including a rectangle expressed in a two-dimensional (2D) coordinate system.

In an embodiment, the processor 110 may set one of the first axis, the second axis, and the third axis as a reference axis. For example, the processor 110 may set one of the x-axis, the y-axis, and the z-axis as the reference axis. For example, the processor 110 may set the z-axis among the x-axis, the y-axis, and the z-axis as the reference axis.

For example, the processor 110 may align first vertices forming a first bounding box around the reference axis by setting one of the first axis, the second axis, and the third axis as the reference axis. For example, the processor 110 may obtain a second bounding box based on aligning the first vertices forming the first bounding box around the reference axis.

In an embodiment, the processor 110 may rotate the first vertices by a specified angle around the reference axis. For example, the processor 110 may identify a quadrangle with the smallest size on a plane formed by axes different from the reference axis, by rotating the first vertices by a specified angle around the reference axis. For example, the processor 110 may identify the quadrangle with the smallest size including an area formed by a convex hull. For example, the processor 110 may obtain the second bounding box based on vertices forming the quadrangle with the smallest size including the area formed by the convex hull. Like the first bounding box, the second bounding box may include a 3D figure expressed in the 3D coordinate system and/or a planar figure expressed in the 2D coordinate system.

In an embodiment, the processor 110 may obtain a minimum value and/or a maximum value of a direction of the reference axis of the first vertices based on a gradient angle of a lane in which the external object is driving. For example, the minimum value may include a minimum z value among z values of the first vertices. For example, the maximum value may include a maximum z value among z values of the first vertices.

In an embodiment, the processor 110 may identify the average of coordinate values of the first vertices. For example, the processor 110 may identify the average of x-coordinates of the first vertices and the average of y-coordinates of the first vertices. For example, the processor 110 may align the first vertices based on the third axis as the reference axis by moving the first bounding box around the third axis among the first axis, the second axis, and the third axis based on the average of the coordinate values of the first vertices.

For example, the processor 110 may generate a matrix corresponding to the average of coordinate values of the first vertices. The processor 110 may align the first vertices around the reference axis based on applying the matrix corresponding to the average of the coordinate values of the first vertices to each of the first vertices.

In an embodiment, the processor 110 may identify the type of an external object. For example, the type of the external object may include at least one of a passenger vehicle, a commercial vehicle, a truck, or a pedestrian, or any combination thereof. The processor 110 may adjust the size of the second bounding box based on the type of the external object.

For example, the processor 110 may adjust the size of the second bounding box to a general size according to the type of the external object. For example, the general size according to the type of the external object may include the size corresponding to the type of the external object stored in the memory.

For example, the processor 110 may adjust the size of the second bounding box to the first size corresponding to the first type based on the type of the external object being the first type. For example, the processor 110 may adjust the size of the second bounding box to the second size corresponding to the second type based on the type of the external object being the second type. It is described that the type of the external object is the first type and the second type, but an embodiment is not limited thereto.

In an embodiment, the processor 110 may adjust the size of the second bounding box based on different processes depending on a location of the external object. For example, if the external object is located in front of the vehicle, the processor 110 may adjust the size of the second bounding box based on the rear surface of the external object. For example, if the external object is located at the rear of the vehicle, the processor 110 may adjust the size of the second bounding box based on the front surface of the external object.

In an embodiment, the processor 110 may enter, into a neural network model, at least one of contour points expressing the shape of the external object, a point cloud expressing the shape of the external object, second vertices forming a second bounding box, or dynamics information of the external object, or any combination thereof. The processor 110 may determine whether the first bounding box or the second bounding box indicates a ghost object, based on entering at least one of the contour points, the point cloud, the second vertices, or the dynamics information, or any combination thereof into the neural network model. For example, the ghost object may include an object that does not interfere with the operation of the vehicle within a region where the vehicle is capable of operating. In other words, a ghost object may be an object that does not interfere with the region (e.g., area) of operation of the vehicle. For example, the ghost object may be referred to as an "invalid object".

For example, the neural network model may be learned by using data associated with the autonomous driving of the vehicle. For example, the neural network model may determine whether the first bounding box or the second bounding box indicates a ghost object, based on points, of which the number (e.g., quantity) is smaller than a specified number and which are included in the second bounding box, by performing learning by using data sets associated with the autonomous driving of the vehicle.

For example, the neural network model may determine whether the first bounding box or the second bounding box indicates a ghost object, by using at least one of absolute speed of the external object, longitudinal speed of the external object, lateral speed of the external object, whether the external object is moving, a heading (e.g., direction) of the external object, a type of the external object, a sensor identifying the external object, reliability of the sensor identifying the external object, shape information based on contour points, points included in the first bounding box, or points included in the second bounding box, or any combination thereof.

For example, the dynamics information may include at least one of the speed of the external object, whether the external object is moving, the longitudinal speed of the external object, or the lateral speed of the external object, or any combination thereof.

In an embodiment, the processor 110 may identify that the first bounding box or the second bounding box indicates a ghost object, based on the fact that there are points forming a specified shape within the second bounding box.

In an embodiment, the processor 110 may identify that the first bounding box or the second bounding box does not indicate a ghost object, based on the fact that points forming the specified shape are not present within the second bounding box.

For example, the specified shape may include a zigzag shape. If there are points forming the specified shape, the fact that the bounding box is identified as an external object is incorrectly determined. Accordingly, the processor 110 may determine that the first bounding box or the second bounding box indicates a ghost object, if points forming the specified shape are present within the second bounding box.

In an embodiment, the processor 110 may control an operation of the vehicle based on the ghost object. For example, the processor 110 may generate a driving route of the vehicle including a ghost object. For example, the processor 110 may control the vehicle such that the vehicle is driving along a driving route, based on generating the driving route of the vehicle including the ghost object.

As mentioned above, according to an embodiment, the processor 110 of the vehicle control apparatus 100 may prevent incorrect determination due to at least one of the location of the external object, the size of the external object, the classification of the external object, the speed of the external object, or a ghost object due to the road gradient, or any combination thereof. Moreover, if the vehicle operates in a driving assistance mode or an autonomous driving mode, the processor 110 of the vehicle control apparatus 100 may provide assistance in the operation of the vehicle by accurately identifying a ghost object.

Figure 2:
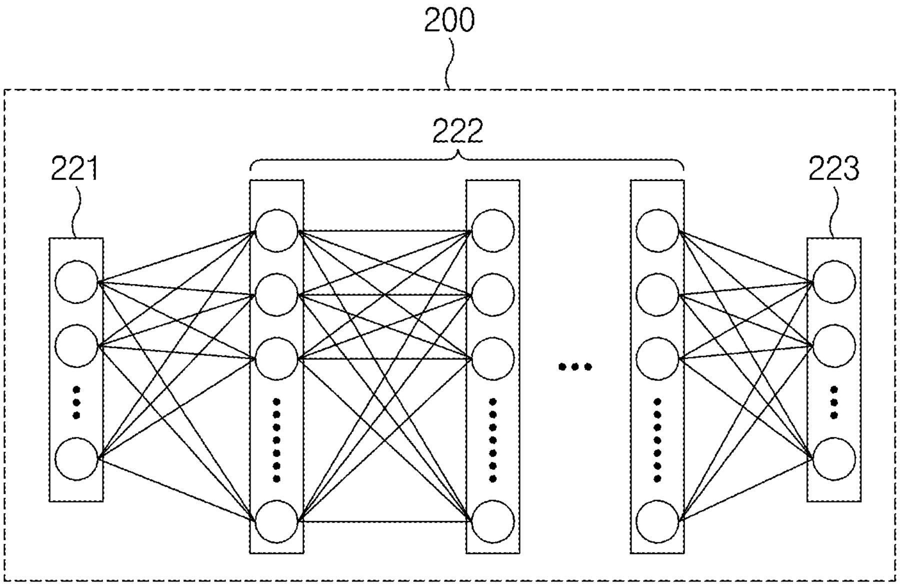
FIG. 2 shows an example of a neural network model stored in a memory, in an embodiment of the present disclosure.

FIG. 2 shows an example of a neural network model stored in a memory, in an embodiment of the present disclosure.

Referring to FIG. 2, a processor (e.g., the processor 110 in FIG. 1) of a vehicle control apparatus (e.g., the vehicle control apparatus 100 of FIG. 1) according to an embodiment may process pieces of feature information, which are obtained from the image data based on a portion of a neural network model 200 and which include different dimensions, based on a portion of the neural network model 200. The portion 220 of the neural network model 200 may include a structure based on fully-connected layers. The portion 220 may include an input layer 221, one or more hidden layers 222, and an output layer 223. The input layer 221 may receive a vector (e.g., a vector with elements corresponding to the number of nodes included in the input layer 221) indicating input data. Signals, which are generated by the input data and which are generated from each of the nodes in the input layer 221, may be transmitted from the input layer 221 to the hidden layers 222. The output layer 223 may generate output data of the second neural network based on one or more signals received from the hidden layers 222. For example, the output data may include a vector with elements corresponding to the number of nodes included in the output layer 223.

The one or more hidden layers 222 may be located between the input layer 221 and the output layer 223, and may convert input data delivered through the input layer 221 into a value to be easy predicted. The input layer 221, the one or more of hidden layers 222, and the output layer 223 may include a plurality of nodes. The one or more hidden layers 222 may be a convolutional filter or fully connected layer in a neural network model (a convolutional neural network), or may be various types of filters or layers grouped based on special functions or characteristics. The neural network according to an embodiment may include the numerous hidden layers 222 to form a deep neural network. The learning of the deep neural network is referred to as "deep learning". The deep neural network may include a first neural network and/or a second neural network. A node, which is included in the hidden layers 222, from among nodes of the second neural network is referred to as a "hidden node".

Nodes included in the input layer 221 and the one or more hidden layers 222 may be connected to each other through connection lines with connection weights, and nodes included in the hidden layer and the output layer may also be connected to each other through connection lines with connection weights. At least one layer may skip the connection to the next layer. The accuracy may be increased by stacking layers deeper through the skipping of a layer. Tuning and/or learning the second neural network may mean changing a connection weight between nodes included in each of layers (e.g., the input layer 221, the one or more hidden layers 222, and the output layer 223) included in the second neural network.

Nodes included in the input layer 221 and the one or more hidden layers 222 may be connected to each other through connection lines with connection weights, and nodes included in the hidden layer and the output layer may also be connected to each other through connection lines with connection weights. For example, the neural network may be tuned based on supervised learning and/or unsupervised learning.

The processor of the vehicle control apparatus according to an embodiment may enter information associated with contour points corresponding to an external object, which are obtained through a sensor (e.g., the LiDAR 120 in FIG. 1), into the input layer 221. For example, the processor may perform noise processing on raw data based on receiving raw data obtained by the sensor (e.g., LiDAR) and may enter an output structure (or structured information) for the external object into the input layer 221.

In an embodiment, the processor may obtain a first bounding box corresponding to the external object. For example, the processor may obtain a second bounding box based on rotating the first bounding box corresponding to the external object around the reference axis. The processor may enter the first bounding box and/or the second bounding box into the input layer 221.

In an embodiment, the processor may obtain dynamics information of the external object. For example, the processor may obtain the dynamics information of the external object by using various sensors. The processor may enter the obtained dynamics information of the external object into the input layer 221. For example, the dynamics information may include at least one of speed information of the external object, whether the external object is moving, a sensor measuring the external object, or the type of the external object, or any combination thereof. However, an embodiment of the present disclosure is not limited to the above description.

In an embodiment, the processor may determine whether the first bounding box or the second bounding box indicates a ghost object, based on entering at least one of an output structure, a first bounding box, a second bounding box, or dynamics information, or any combination thereof for the external object into the input layer 221. For example, the processor may determine whether the first bounding box or the second bounding box indicates a ghost object, based on output data output through the output layer 223.

As described above, the processor of the vehicle control apparatus according to an embodiment may relatively quickly and accurately identify that the first bounding box or second bounding box indicates a ghost object, by determining whether the first bounding box or the second bounding box indicates a ghost object, based on the neural network model 200.

FIG. 3 shows an example associated with contour points corresponding to an external object, and vertices of a first virtual box corresponding to an external object, in an embodiment of the present disclosure.

Referring to FIG. 3, a processor (e.g., the processor 110 in FIG. 1) of a vehicle control apparatus (e.g., the vehicle control apparatus 100 of FIG. 1) according to an embodiment may obtain a plurality of points corresponding to an external object through a sensor (e.g., the LiDAR 120 in FIG. 1).

For example, the processor may obtain contour points 313 and/or a point cloud based on a plurality of points corresponding to the external object.

In an embodiment, the processor may obtain a first bounding box including the contour points 313 and/or the point cloud.

For example, the processor may identify vertices 311 of the first bounding box. For example, the processor may identify the first vertices 311 of the first bounding box in a 3D coordinate system. For example, the processor may identify coordinates of each of the first vertices 311 forming the first bounding box (or included in the first bounding box) in the 3D coordinate system.

In an embodiment, the processor may obtain second vertices by rotating the vertices 311 around the reference axis. The processor may generate a second bounding box based on the second vertices.

In an embodiment, the processor may determine whether the first bounding box or the second bounding box indicates a ghost object, based on entering the second vertices included in the second bounding box, the contour points corresponding to the external object, and the dynamics information of the external object into a neural network model.

Figure 4:
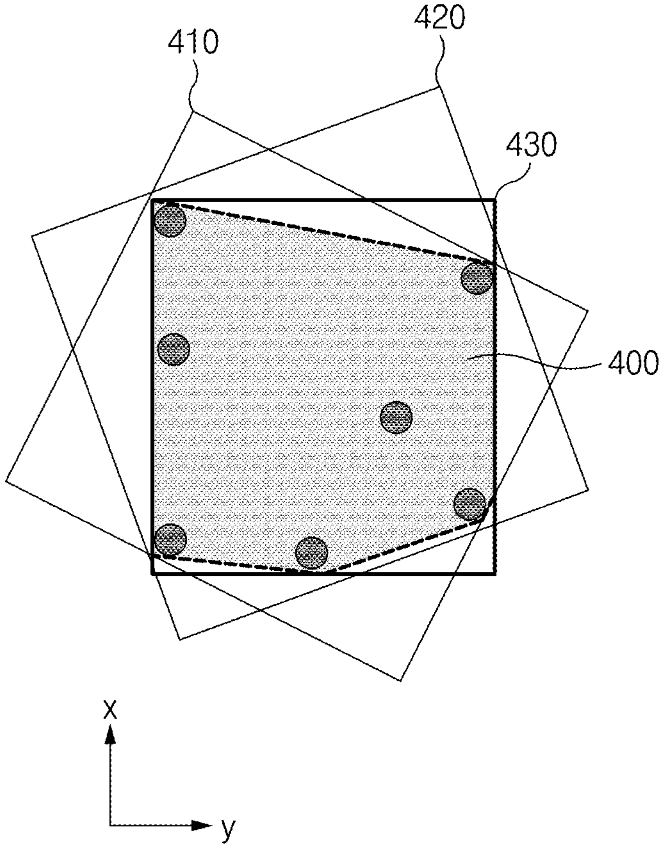
FIG. 4 shows an example of rotating vertices around a reference axis to obtain a second bounding box, in an embodiment of the present disclosure.

FIG. 4 shows an example of rotating vertices around a reference axis to obtain a second bounding box, in an embodiment of the present disclosure.

Referring to FIG. 4, a processor (e.g., the processor 110 in FIG. 1) of a vehicle control apparatus (e.g., the vehicle control apparatus 100 of FIG. 1) according to an embodiment may project a first bounding box corresponding to an external object onto a plane formed by a first axis and a second axis. For example, the processor may project the first bounding box onto an x-y plane formed by an x-axis and a y-axis.

In an embodiment, the processor may obtain a first quadrangle 410 based on projecting the first bounding box onto the plane formed by the first axis and the second axis.

In an embodiment, the processor may obtain a second quadrangle 420 obtained by rotating the first quadrangle 410 by a specified angle around the reference axis.

In an embodiment, the processor may obtain a third quadrangle 430 obtained by rotating the second quadrangle 420 by a specified angle around the reference axis.

In an embodiment, the processor may identify a quadrangle, which includes a FIG. 400 generated by a convex hull and which includes the smallest size, from among the obtained quadrangles 410, 420, and 430. For example, in FIG. 4, the quadrangle that includes the FIG. 400 generated by the convex hull and includes the smallest size may be the third quadrangle 430.

For example, the angle for obtaining the third quadrangle 430 may be identified based on equations below.

$$\theta^* = \underset{\theta}{\operatorname{argmin}}(\text{max\_x} - \text{min\_x})(\text{max\_y} - \text{min\_y}) \quad \text{[Equation 1]}$$

Equation 1 may include an equation for obtaining θ*, which is an angle for obtaining the third quadrangle 430. In Equation 1, max_x, min_x, max_y, and min_y may be obtained based on Equations 2 to 7 below. argmin θ may include an operation of finding a factor whose the result value of a function or arithmetic operation for θ is the minimum.

$$\text{min\_x} = \min_x PR_z(\theta^*) \quad \text{[Equation 2]}$$

In Equation 2, min_x may mean a minimum x value to be input into Equation 1. For example, min_x may be obtained based on Equation 8 and Equation 9, which will be described later.

$$\text{min\_y} = \min_y PR_z(\theta^*) \quad \text{[Equation 3]}$$

In Equation 3, min y may mean a minimum y value to be input into Equation 1. For example, min_y may be obtained based on Equation 8 and Equation 9, which will be described later.

$$\text{min\_z} = \min_z P \quad \text{[Equation 4]}$$

In Equation 4, min_z may mean a minimum z value among z values and may be obtained based on Equation 8, which will be described later.

$$\text{max\_x} = \max_x PR_z(\theta^*) \quad \text{[Equation 5]}$$

In Equation 5, max_x may mean a maximum x value to be input into Equation 1. For example, max_x may be obtained based on Equation 8 and Equation 9, which will be described later.

$$\text{max\_y} = \max_y PR_z(\theta^*) \quad \text{[Equation 6]}$$

In Equation 6, max_y may mean a maximum y value to be input into Equation 1. For example, max y may be obtained based on Equation 8 and Equation 9, which will be described later.

$$\max\_z = \max_z P \quad \text{[Equation 7]}$$

In Equation 7, max_z may mean a maximum z value among z values, and may be obtained based on Equation 8, which will be described later.

$$P = \begin{bmatrix} x_1 & y_1 & z_1 \\ \vdots & \vdots & \vdots \\ x_n & y_n & z_n \end{bmatrix} \quad \text{[Equation 8]}$$

Equation 8 may mean P in Equations 2 to 7. For example, in Equation 8, P may include a matrix including x values, y values, and z values.

$$R_z(\theta) = \begin{bmatrix} \cos\theta & -\sin\theta & 0 \\ \sin\theta & \cos\theta & 0 \\ 0 & 0 & 1 \end{bmatrix} \quad \text{[Equation 9]}$$

Equation 9 may include a matrix associated with angle θ for rotating a quadrangle. For example, in Equation 9, $R_z(\theta)$ may include a matrix for rotating quadrangle by θ.

In an embodiment, the processor may rotate a quadrangle by the specified angle by using Equations 1 to 9 described above. If a new quadrangle is generated by rotating the quadrangle by the specified angle by using Equation 1 to Equation 9, the processor may determine whether the new quadrangle includes a figure generated by a convex hull, and a size of the new quadrangle.

The processor may perform the processes described above by repeatedly rotating the quadrangle by the specified angle.

In an embodiment, the processor may identify the quadrangle with the smallest size among quadrangles including the figure generated by the convex hull, by repeatedly performing the processes described above. The processor may generate (or obtain) a second bounding box based on the quadrangle with the smallest size among the quadrangles including the figures generated by the convex hull.

In an embodiment, the processor may determine whether the first bounding box or the second bounding box indicates a ghost object, by entering the generated second bounding box into the neural network model.

Figure 5:
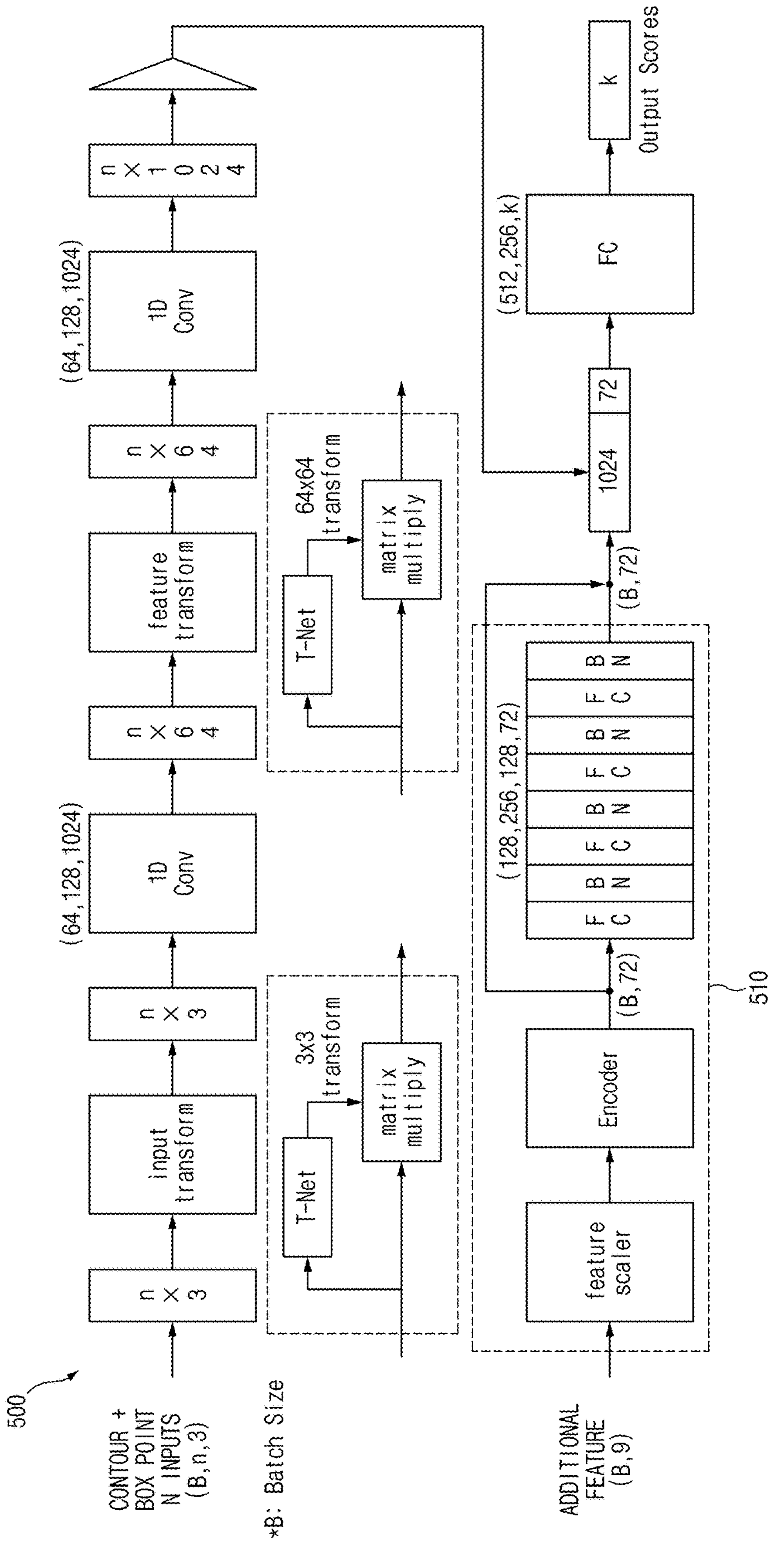
FIG. 5 shows an example of a neural network model, in an embodiment of the present disclosure.

FIG. 5 shows an example of a neural network model, in an embodiment of the present disclosure.

Referring to FIG. 5, a memory (e.g., the memory 130 of FIG. 1) of a vehicle control apparatus (e.g., the vehicle control apparatus 100 of FIG. 1) according to an embodiment may include a neural network model 500. For example, the neural network model 500 may be stored in a memory.

For example, a portion 510 of the neural network model 500 may include an input layer for receiving dynamics information associated with an external object. For example, the dynamics information may include at least one of absolute speed of the external object, longitudinal speed of the external object, lateral speed of the external object, or a heading direction of the external object, or any combination thereof. For example, the longitudinal speed of the external object may include the speed of the x-axis direction among an x-axis, a y-axis, and a z-axis. For example, the lateral speed of the external object may include the speed of the y-axis direction among the x-axis, the y-axis, and the z-axis.

For example, the portion 510 of the neural network model 500 and other portions may include an input layer for receiving information associated with contour points corresponding to the external object, and vertices of a bounding box corresponding to the external object.

For example, the contour points corresponding to the external object may include points indicating the shape of the external object among a plurality of points obtained through a sensor (e.g., the LiDAR 120 in FIG. 1).

For example, the information associated with the vertices of the bounding box corresponding to the external object may include coordinates of each of vertices included in a bounding box (e.g., a second bounding box) corresponding to the external object.

In an embodiment, the neural network model 500 may be learned based on a learning data set associated with the autonomous driving of the vehicle. The neural network model 500 may be learned based on the relatively small number of points, and thus may relatively accurately identify an external object even if a point cloud corresponding to the external object composed of the small number of points is used.

Figure 6:
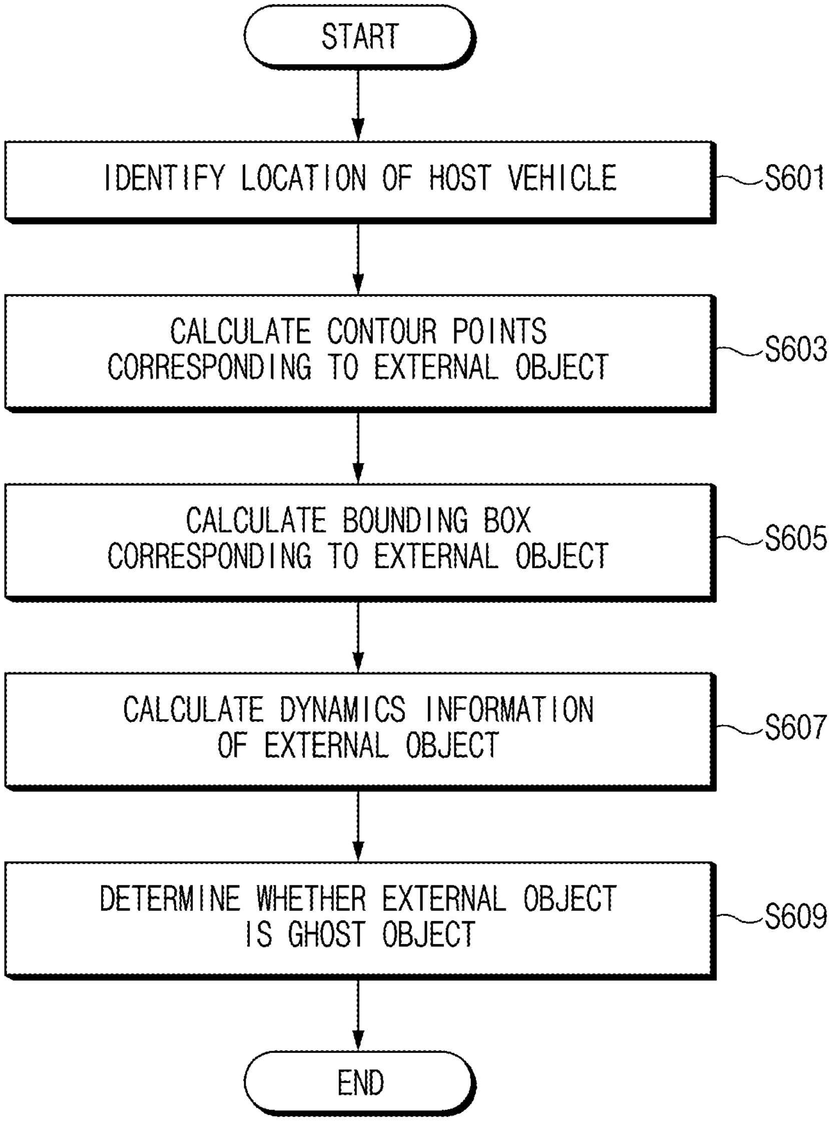
FIG. 6 shows an example of a flowchart associated with a vehicle control method, according to an embodiment of the present disclosure.

FIG. 6 shows an example of a flowchart associated with a vehicle control method, according to an embodiment of the present disclosure.

Hereinafter, it is assumed that the vehicle control apparatus 100 of FIG. 1 performs the process of FIG. 6. In addition, in a description of FIG. 6, it may be understood that an operation described as being performed by an apparatus is controlled by the processor 110 of the vehicle control apparatus 100.

At least one of operations of FIG. 6 may be performed by the vehicle control apparatus 100 of FIG. 1. At least one of operations of FIG. 6 may be performed by the processor 110 of FIG. 1. Each of the operations in FIG. 6 may be performed sequentially, but is not necessarily sequentially performed. For example, the order of operations may be changed, and at least two operations may be performed in parallel.

Referring to FIG. 6, in S601, a vehicle control method according to an embodiment may include an operation of identifying a location of a vehicle. For example, the vehicle control method may include an operation of identifying the location of the vehicle based on at least one of a precision map, or a global positioning system (GPS), or any combination thereof.

The location of the vehicle may be used to measure the altitude of the vehicle or an external object.

In S603, the vehicle control method according to an embodiment may include an operation of calculating contour points corresponding to the external object. For example, the vehicle control method may include an operation of receiving raw data from a sensor (e.g., the LiDAR 120 in FIG. 1) and performing noise processing on the received raw data. The vehicle control method may include an operation of obtaining an output structure associated with the external object based on performing noise processing. For example, the output structure may include various pieces of information associated with the external object.

In S605, the vehicle control method according to an embodiment may include an operation of calculating a bounding box corresponding to the external object. For example, the vehicle control method may include an operation of rotating a first bounding box corresponding to the external object around a reference axis and obtaining a second bounding box. For example, the operation of obtaining the second bounding box may include an operation of generating the second bounding box based on a quadrangle with the smallest size including a figure formed by the convex hull, as described in FIG. 4.

In S607, the vehicle control method according to an embodiment may include an operation of calculating dynamics information of the external object. For example, the dynamics information of the external object may be calculated based on at least one of speed information of the external object, whether the external object is moving, a sensor measuring the external object, or the type of the external object, or any combination thereof.

In S609, the vehicle control method according to an embodiment may include an operation of determining whether the external object is a ghost object. For example, the vehicle control method may include an operation of determining whether a bounding box (e.g., the second bounding box described previously) corresponding to the external object is a ghost object.

For example, the vehicle control method may include an operation of determining whether the external object is a ghost object, by determining whether the bounding box corresponding to the external object is a ghost object.

For example, the vehicle control method may include an operation of determining whether the bounding box corresponding to the external object is a ghost object, based on entering contour points corresponding to the external object, the bounding box corresponding to the external object, and the dynamics information of the external object into a neural network model.

Figure 7:
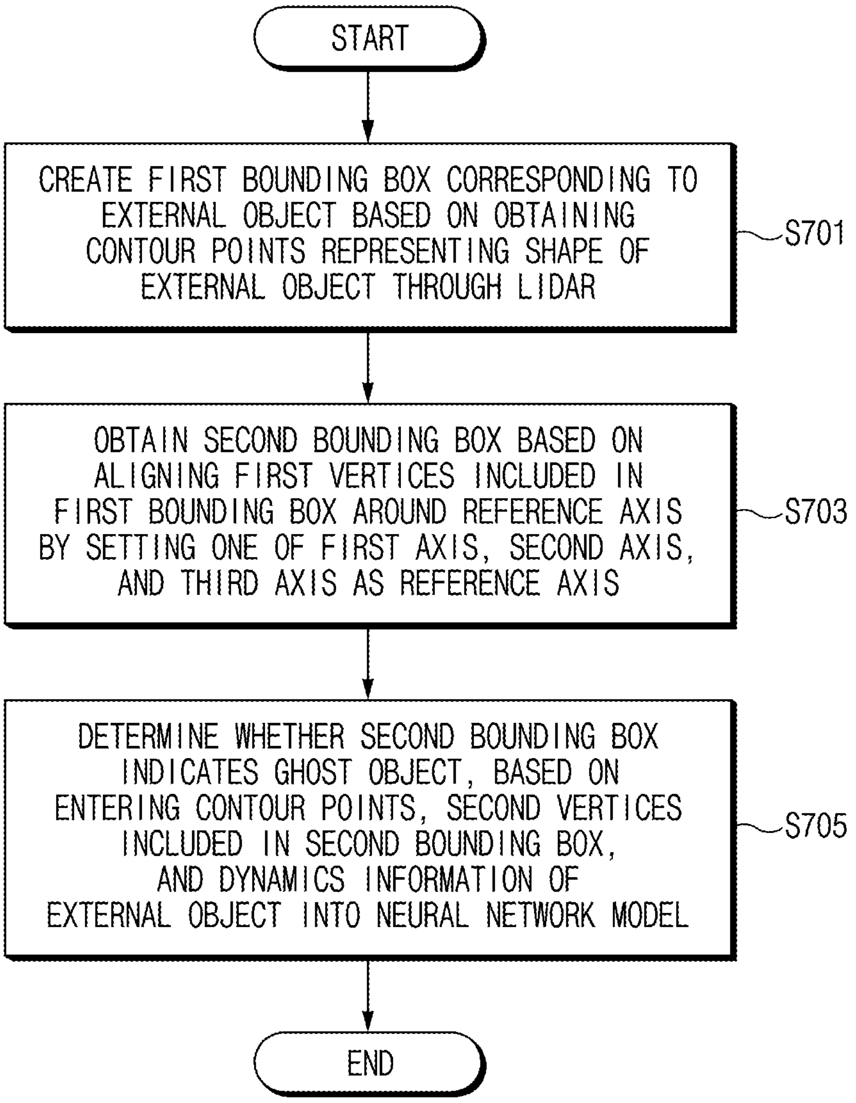
FIG. 7 shows an example of a flowchart associated with a vehicle control method, according to an embodiment of the present disclosure.

FIG. 7 shows an example of a flowchart associated with a vehicle control method, according to an embodiment of the present disclosure.

Hereinafter, it is assumed that the vehicle control apparatus 100 of FIG. 1 performs the process of FIG. 7. In addition, in a description of FIG. 7, it may be understood that an operation described as being performed by an apparatus is controlled by the processor 110 of the vehicle control apparatus 100.

At least one of operations of FIG. 7 may be performed by the vehicle control apparatus 100 of FIG. 1. At least one of operations of FIG. 7 may be performed by the processor 110 of FIG. 1. Each of the operations in FIG. 7 may be performed sequentially, but is not necessarily sequentially performed. For example, the order of operations may be changed, and at least two operations may be performed in parallel.

Referring to FIG. 7, in S701, a vehicle control method according to an embodiment may include an operation of generating a first bounding box corresponding to an external object based on obtaining contour points representing a shape of the external object through a sensor (e.g., the LiDAR 120 in FIG. 1).

In S703, the vehicle control method according to an embodiment may include an operation of obtaining a second bounding box based on aligning first vertices included in a first bounding box around a reference axis by setting one of a first axis, a second axis, and a third axis as the reference axis.

The vehicle control method according to an embodiment may include an operation of identifying a quadrangle with the smallest size on a plane formed by axes different from the reference axis, by rotating the first vertices by a specified angle around the reference axis. For example, the vehicle control method according to an embodiment may include an operation of obtaining the second bounding box based on vertices included in the quadrangle.

The vehicle control method according to an embodiment may include an operation of obtaining a minimum value and a maximum value of a direction of the reference axis of the first vertices based on a gradient angle of a lane in which the external object is identified. For example, the vehicle control method according to an embodiment may include an operation of obtaining the second bounding box based on the minimum value, the maximum value, and vertices included in the quadrangle.

The vehicle control method according to an embodiment may include aligning the first vertices based on the reference axis by moving the first bounding box around one of the first axis, the second axis, and the third axis based on an average of coordinate values of the first vertices.

According to an embodiment, the vehicle control method may include an operation of aligning the first vertices with the center of gravity of the first bounding box as the reference axis.

The vehicle control method according to an embodiment may include an operation of adjusting a size of the second bounding box based on a type of the external object.

For example, the vehicle control method according to an embodiment may include an operation of adjusting the size of the second bounding box based on the rear surface of the external object if the external object is located in front of the vehicle.

For example, the vehicle control method according to an embodiment may include an operation of adjusting the size of the second bounding box based on the front surface of the external object if the external object is located at the rear of the vehicle.

In S705, the vehicle control method according to an embodiment may include an operation of determining whether the first bounding box or the second bounding box indicates the ghost object, based on entering the contour points, the second vertices included in the second bounding box, and the dynamics information of the external object into a neural network model.

In an embodiment, the neural network model may determine whether the first bounding box or the second bounding box indicates a ghost object, based on points, of which the number is smaller than a specified number and which are included in the second bounding box, by performing learning by using data sets associated with the autonomous driving of the vehicle.

In an embodiment, the neural network model may determine whether the first bounding box or the second bounding box indicates a ghost object, by using at least one of absolute speed of the external object, longitudinal speed of the external object, lateral speed of the external object, whether the external object is moving, a heading direction of the external object, a type of the external object, a sensor identifying the external object, the reliability of the sensor identifying the external object, shape information based on contour points, points included in the first bounding box, or points included in the second bounding box, or any combination thereof.

For example, the dynamics information may include at least one of speed of the external object, whether the external object is moving, a sensor measuring the external object, or the type of the external object, or any combination thereof.

The vehicle control method according to an embodiment may include an operation of identifying that the first bounding box or the second bounding box indicates the ghost object, based on a fact that there are points forming a specified shape within the second bounding box.

The vehicle control method according to an embodiment may include an operation of identifying that the first bounding box or the second bounding box does not indicate the ghost object, based on a fact that there are no points forming a specified shape within the second bounding box.

The vehicle control method according to an embodiment may include an operation of controlling the operation of the vehicle based on a ghost object. For example, the vehicle control method may include an operation of generating a driving route of the vehicle including a ghost object. For example, the vehicle control method may include an operation of controlling the vehicle such that the vehicle is driving along a driving route, based on generating the driving route of the vehicle including the ghost object.

Figure 8:
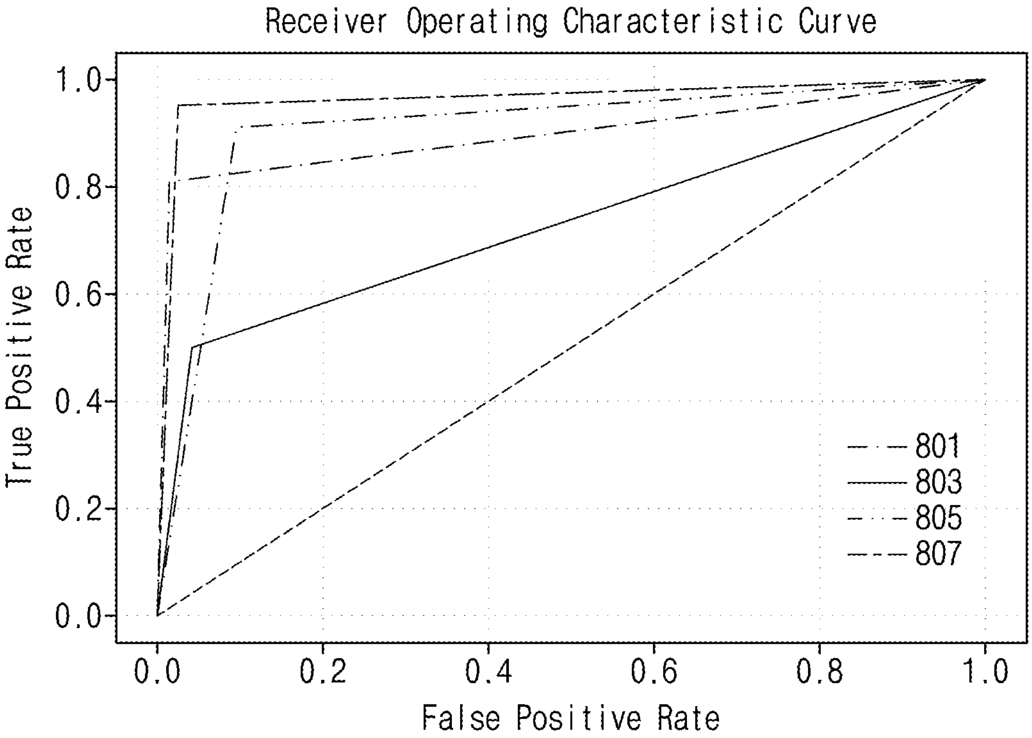
FIG. 8 shows an example of a graph associated with the result of applying the present disclosure.

FIG. 8 shows an example of a graph associated with the result of applying the present disclosure.

Referring to FIG. 8, a graph shown in FIG. 8 may include an example of a graph showing a receiver operating characteristic curve (ROC).

For example, a horizontal axis of the graph shown in FIG. 8 may represent a false positive rate. A vertical axis of the graph shown in FIG. 8 may represent a true positive rate.

In FIG. 8, a first line 801 may include an example of the result of determining whether a bounding box corresponding to an external object is a ghost object, based on the type (or class) of the external object. In FIG. 8, a second line 803 may include an example of the result of determining whether the bounding box corresponding to the external object is a ghost object, based on contour points corresponding to the external object. In FIG. 8, a third line 805 may include an example of the result of determining whether the bounding box corresponding to the external object is a ghost object, based on the contour points corresponding to the external object, and vertices of the bounding box. In FIG. 8, a fourth line 807 may include an example of the result of determining whether the bounding box corresponding to the external object is a ghost object, based on the contour points corresponding to the external object, the vertices of the bounding box, and dynamics information.

As the true positive rate is great and the false positive rate is small, the graph in FIG. 8 may indicate that relatively accurate identification. As may be seen in FIG. 8, if it is determined whether the bounding box indicates a ghost object, it may be identified that the most accurate result is output, based on the contour points, the vertices of the bounding box, and the dynamics information.

Figure 9:
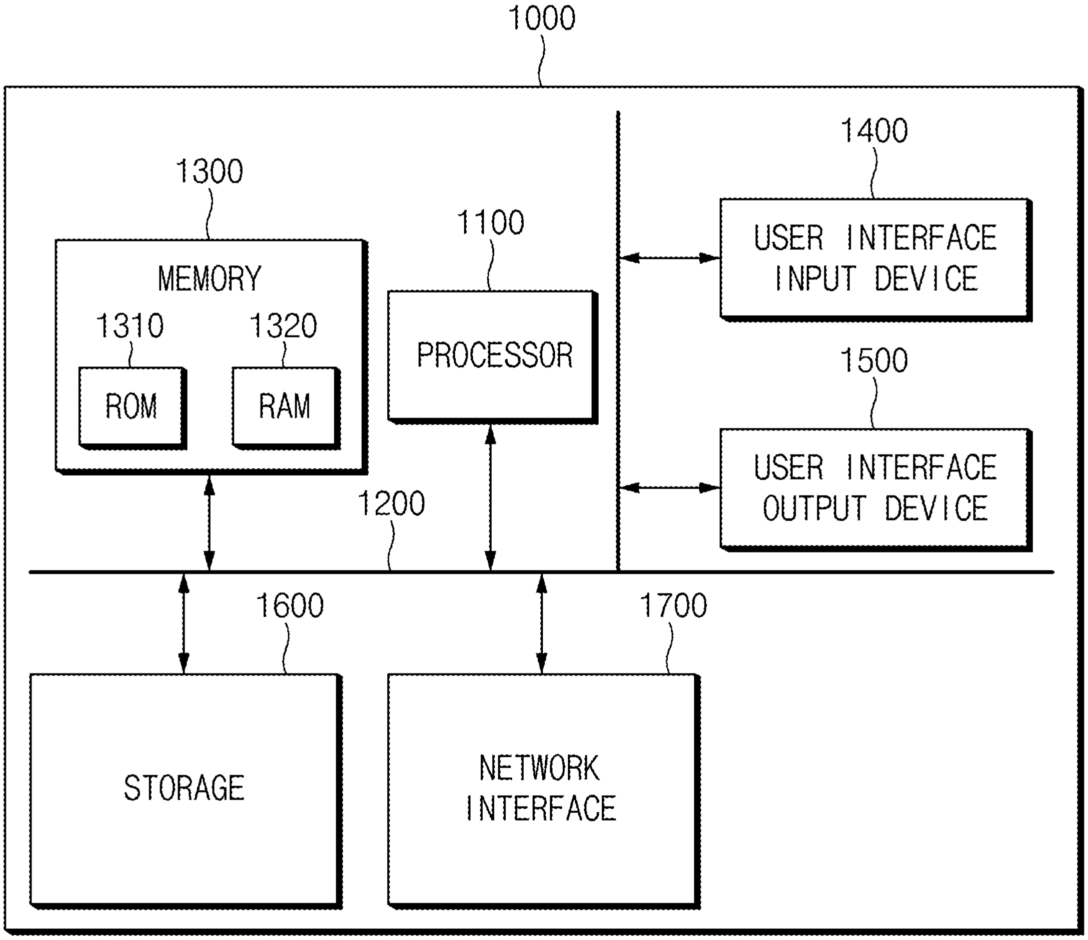
FIG. 9 shows a computing system associated with a vehicle control apparatus or vehicle control method, according to an embodiment of the present disclosure.

FIG. 9 shows a computing system associated with a vehicle control apparatus or vehicle control method, according to an embodiment of the present disclosure.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

The present technology may provide assistance in a driving assistance mode of a vehicle or an autonomous driving mode of the vehicle by identifying invalid objects that do not cause collisions with the vehicle.

Moreover, the present technology may improve the driving stability of the vehicle by determining that an external object is a ghost object, based on dynamics information of the external object, together with information (e.g., at least one of contour points, or a bounding box, or any combination thereof) associated with the shape of the external object.

Furthermore, the present technology may prevent sudden braking of the vehicle to provide a comfortable driving environment for passengers of the vehicle, by relatively accurately distinguishing between a valid object and an invalid object (e.g., a ghost object).

Besides, a variety of effects directly or indirectly understood through the present disclosure may be provided.

The present technology may provide assistance in a driving assistance mode of a vehicle or an autonomous driving mode of the vehicle by identifying invalid objects that do not cause collisions with the vehicle.

Moreover, the present technology may improve the driving stability of the vehicle by determining that an external object is a ghost object, based on dynamics information of the external object, together with information (e.g., at least one of contour points, or a bounding box, or any combination thereof) associated with the shape of the external object.

Furthermore, the present technology may prevent sudden braking of the vehicle to provide a comfortable driving environment for passengers of the vehicle, by relatively accurately distinguishing between a valid object and an invalid object (e.g., a ghost object).

Besides, a variety of effects directly or indirectly understood through the present disclosure may be provided.

Hereinabove, although the present disclosure was described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control apparatus comprising:

a light detection and ranging (LiDAR); and a processor configured to:

generate, based on contour points obtained through the LiDAR and representing a shape of an external object of a vehicle, a first bounding box corresponding to the external object;

generate, based on aligning first vertices included in the first bounding box around a reference axis, a second bounding box, wherein the reference axis is chosen from one of a first axis, a second axis, and a third axis, wherein the first axis, the second axis, and the third axis are perpendicular to each other;

determine whether the first bounding box or the second bounding box indicates that the external object does not interfere with an operation region of the vehicle, based on the contour points, second vertices included in the second bounding box, and dynamics information of the external object; and control, based on the determination, an operation of the vehicle, wherein the processor is further configured to:

align the first vertices by moving, based on an average of coordinate values of the first vertices, the first bounding box around the reference axis.

2. The vehicle control apparatus of claim 1, wherein the processor is configured to generate the second bounding box by:

determining, by rotating the first vertices by a predetermined angle around the reference axis, a quadrilateral having a smallest size on a plane formed by axes different from the reference axis, wherein the axes are two axes of the first axis, the second axis, and the third axis; and determining the second bounding box based on vertices included in the quadrilateral.

3. The vehicle control apparatus of claim 2, wherein the processor is configured to generate the second bounding box by:

determining, based on a gradient angle of a lane in which the external object is located, a minimum value and a maximum value of the first vertices in a direction of the reference axis; and determining the second bounding box further based on the minimum value and the maximum value.

4. The vehicle control apparatus of claim 1, wherein the processor is further configured to:

adjust a size of the second bounding box based on a type of the external object.

5. The vehicle control apparatus of claim 4, wherein the processor is configured to adjust the size of the second bounding box by one of:

adjusting, based on the external object being located in front of the vehicle, the size of the second bounding box based on a rear surface of the external object; or adjusting, based on the external object being located at a rear of the vehicle, the size of the second bounding box based on a front surface of the external object.

6. The vehicle control apparatus of claim 1, wherein the processor is configured to:

determine, based on points within the second bounding box forming a specified shape, that the first bounding box or the second bounding box indicates that the external object does not interfere with the operation region of the vehicle.

7. The vehicle control apparatus of claim 1, wherein the processor is configured to:

determine, based on no points within the second bounding box forming a specified shape, that the first bounding box or the second bounding box indicates that the external object interferes with the operation region of the vehicle.

8. The vehicle control apparatus of claim 1, further comprising:

memory storing a neural network model, wherein the processor is configured to determine whether the first bounding box or the second bounding box indicates that the external object does not interfere with the operation region of the vehicle based on applying the contour points, the second vertices, and the dynamics information into the neural network model, and wherein the neural network model is configured to determine whether the first bounding box or the second bounding box indicates that the external object does not interfere with the operation region of the vehicle, based on points, which are included in the second bounding box, by performing learning by using data sets associated with autonomous driving of the vehicle.

9. The vehicle control apparatus of claim 1, further comprising:

memory storing a neural network model, wherein the processor is configured to determine whether the first bounding box or the second bounding box indicates that the external object does not interfere with the operation region of the vehicle, based on applying the contour points, the second vertices, and the dynamics information into the neural network model, and wherein the neural network model is configured to determine whether the first bounding box or the second bounding box indicates that the external object does not interfere with the operation region of the vehicle, by using parameters comprising at least one of an absolute speed of the external object, a longitudinal speed of the external object, a lateral speed of the external object, whether the external object is moving, a heading of the external object, a type of the external object, a sensor identifying the external object, reliability of the sensor, shape information associated with contour points, points included in the first bounding box, or points included in the second bounding box.

10. The vehicle control apparatus of claim 1, wherein the dynamics information comprises at least one of a speed of the external object, whether the external object is moving, a sensor identifying the external object, or a type of the external object.

11. A vehicle control method comprising:

generating, based on contour points obtained through a light detection and ranging (LiDAR) and representing a shape of an external object of a vehicle, a first bounding box corresponding to the external object;

generating, based on aligning first vertices included in the first bounding box around a reference axis, a second bounding box, wherein the reference axis is chosen from one of a first axis, a second axis, and a third axis, wherein the first axis, the second axis, and the third axis are perpendicular to each other;

determining whether the first bounding box or the second bounding box indicates that the external object does not interfere with an operation region of the vehicle based on the contour points, second vertices included in the second bounding box, and dynamics information of the external object; and controlling, based on the determination and based on a determined route, a movement of the vehicle, wherein the method further comprises:

aligning the first vertices by moving, based on an average of coordinate values of the first vertices, the first bounding box around the reference axis.

12. The method of claim 11, wherein the generating of the second bounding box comprises:

determining, by rotating the first vertices by a predetermined angle around the reference axis, a quadrilateral having a smallest size on a plane formed by axes different from the reference axis, wherein the axes are two axes of the first axis, the second axis, and the third axis; and determining the second bounding box based on vertices included in the quadrilateral.

13. The method of claim 12, wherein the generating of the second bounding box comprises:

determining, based on a gradient angle of a lane in which the external object is located, a minimum value and a maximum value of the first vertices in a direction of the reference axis; and determining the second bounding box further based on the minimum value and the maximum value.

14. The method of claim 11, further comprising:

adjusting a size of the second bounding box based on a type of the external object.

15. The method of claim 14, wherein the adjusting of the size of the second bounding box comprises one of:

adjusting, based on the external object being located in front of the vehicle, the size of the second bounding box based on a rear surface of the external object; or adjusting, based on the external object being located at a rear of the vehicle, the size of the second bounding box based on a front surface of the external object.

16. The method of claim 11, further comprising:

determining, based on points within the second bounding box forming a specified shape, that the first bounding box or the second bounding box indicates that the external object does not interfere with the operation region of the vehicle.

17. The method of claim 11, further comprising:

determining, based on no points within the second bounding box forming a specified shape, that the first bounding box or the second bounding box indicates that the external object interferes with the operation region of the vehicle.

18. The method of claim 11, further comprising:

determining whether the first bounding box or the second bounding box indicates that the external object does not interfere with the operation region of the vehicle based on applying the contour points, the second vertices, and the dynamics information into a neural network model, wherein the neural network model is configured to determine whether the first bounding box or the second bounding box indicates that the external object does not interfere with the operation region of the vehicle, based on points, which are included in the second bounding box, by performing learning by using data sets associated with autonomous driving of the vehicle.

19. A vehicle control apparatus comprising:

a light detection and ranging (LiDAR); and a processor configured to:

generate, based on contour points obtained through the LiDAR and representing a shape of an external object of a vehicle, a first bounding box corresponding to the external object;

generate, based on aligning first vertices included in the first bounding box around a reference axis, a second bounding box, wherein the reference axis is chosen from one of a first axis, a second axis, and a third axis, wherein the first axis, the second axis, and the third axis are perpendicular to each other;

determine whether the first bounding box or the second bounding box indicates that the external object does not interfere with an operation region of the vehicle, based on the contour points, second vertices included in the second bounding box, and dynamics information of the external object; and control, based on the determination, an operation of the vehicle, wherein the processor is further configured to:

adjust, based on the external object being located in front of the vehicle, a size of the second bounding box based on a rear surface of the external object; or adjust, based on the external object being located at a rear of the vehicle, the size of the second bounding box based on a front surface of the external object.

* * * * *